(12) United States Patent
Fink et al.

(10) Patent No.: US 10,785,269 B2
(45) Date of Patent: Sep. 22, 2020

(54) AUGMENTED REALITY PLATFORM FOR PROFESSIONAL SERVICES DELIVERY

(71) Applicant: STREEM, INC., Portland, OR (US)

(72) Inventors: Ryan R. Fink, Vancouver, WA (US); Sean M. Adkinson, North Plains, OR (US)

(73) Assignee: STREEM, INC., Portland, OR (US)

( * ) Notice: Subject to any disclaimer, the term of this patent is extended or adjusted under 35 U.S.C. 154(b) by 0 days.

(21) Appl. No.: 16/195,595

(22) Filed: Nov. 19, 2018

(65) Prior Publication Data

US 2019/0158547 A1    May 23, 2019

Related U.S. Application Data

(60) Provisional application No. 62/588,612, filed on Nov. 20, 2017.

(51) Int. Cl.
| | |
|---|---|
| *H04L 29/06* | (2006.01) |
| *G06K 9/00* | (2006.01) |
| *G06T 19/00* | (2011.01) |
| *H04N 7/14* | (2006.01) |
| *G06Q 30/00* | (2012.01) |
| *G06F 3/0482* | (2013.01) |
| *H04N 7/15* | (2006.01) |

(52) U.S. Cl.
CPC ...... *H04L 65/1089* (2013.01); *G06K 9/00671* (2013.01); *G06K 9/00979* (2013.01); *G06Q 30/00* (2013.01); *G06T 19/006* (2013.01); *H04L 65/1069* (2013.01); *H04N 7/147* (2013.01); *G06F 3/0482* (2013.01); *G06T 2219/024* (2013.01); *H04L 67/38* (2013.01); *H04N 7/15* (2013.01)

(58) Field of Classification Search
CPC . H04L 65/1089; H04L 65/1069; H04L 67/38; G06K 9/00671; G06K 9/00979; G06Q 30/00; G06T 19/006; G06T 2219/024; G06F 3/0482; H04N 7/147; H04N 7/15
See application file for complete search history.

(56) References Cited

U.S. PATENT DOCUMENTS

| | | | |
|---|---|---|---|
| 10,182,153 B2 | 1/2019 | Amir | |
| 10,313,523 B2 | 6/2019 | Amir | |
| 10,395,290 B1* | 8/2019 | Koo | ............ H04M 3/5233 |
| 10,397,404 B1 | 8/2019 | Amir | |
| 10,560,578 B2 | 2/2020 | Amir | |
| 10,567,583 B2 | 2/2020 | Amir | |

(Continued)

FOREIGN PATENT DOCUMENTS

WO    2019215507 A2    11/2019

*Primary Examiner* — Chong Wu
(74) *Attorney, Agent, or Firm* — Schwabe, Williamson & Wyatt, P.C.

(57) ABSTRACT

Methods and systems for the remote delivery of professional services, using augmented reality (AR), are disclosed. In embodiments, a user transmits an image or video to a server, which provides a list of professionals on the basis of object recognition performed on the image or video. The user selects a professional, and the server initiates a video session between a user device and a professional device, where the professional can superimpose one or more AR objects on the video, to be displayed on the user device.

20 Claims, 6 Drawing Sheets

(56) References Cited

U.S. PATENT DOCUMENTS

| | | |
|---|---|---|
| 10,567,584 B2 | 2/2020 | Amir |
| 2017/0352282 A1* | 12/2017 | Anderson ................ G09B 5/02 |
| 2018/0101985 A1* | 4/2018 | Jones-McFadden ........................ G06T 19/006 |
| 2018/0159979 A1 | 6/2018 | Amir |
| 2018/0322702 A1* | 11/2018 | Djajadiningrat ..... A61B 5/0404 |
| 2019/0089833 A1 | 3/2019 | Amir |
| 2019/0253559 A1 | 8/2019 | Amir |
| 2019/0253560 A1 | 8/2019 | Amir |
| 2019/0268470 A1 | 8/2019 | Amir |
| 2019/0268471 A1 | 8/2019 | Amir |
| 2019/0268472 A1 | 8/2019 | Amir |
| 2019/0268473 A1 | 8/2019 | Amir |

* cited by examiner

AUGMENTED REALITY PLATFORM FOR PROFESSIONAL SERVICES DELIVERY

RELATED APPLICATIONS

The present disclosure claims priority to U.S. Provisional Application Ser. No. 62/588,612, filed 20 Nov. 2017, the contents of which are hereby incorporated by reference as if fully set forth herein.

TECHNICAL FIELD

The present disclosure relates to the field of augmented reality (AR), and specifically to a platform for delivery of professional services that use augmented reality.

BACKGROUND

Delivery of professional services, such as plumbing, household repairs, electrical jobs, or any other services that may require some form of interaction with physical objects typically require a professional rendering services to be physically on-site. As a result, the cost of retaining the professional may be increased to account for the professional's travel time to and from the job site. The professional may consequently see a reduction in revenue due to some customers being unwilling to pay the increased costs to cover travel, or possibly not retaining the professional for smaller jobs where the travel costs would approach, or even exceed, the actual cost of performing the job. Some professionals may simply refuse to accept smaller jobs due to the time commitment, even where a potential customer would be willing to pay the professional.

The consumer may instead decide to perform the work on a do-it-yourself (DIY) basis, to either save money or out of necessity. While this may be an acceptable solution for relatively simple jobs, more complex jobs may need a professional to be performed safely or correctly. In some cases a professional may be willing to provide advice remotely via a phone call or even video chat. The consumer may further be able to use the call or chat in real-time while working on the job. However, depending on the nature of the job, simple discussion over audio or video may not be sufficient, as the consumer does not have the benefit of the professional being able to visually show the consumer actions that need to be performed.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
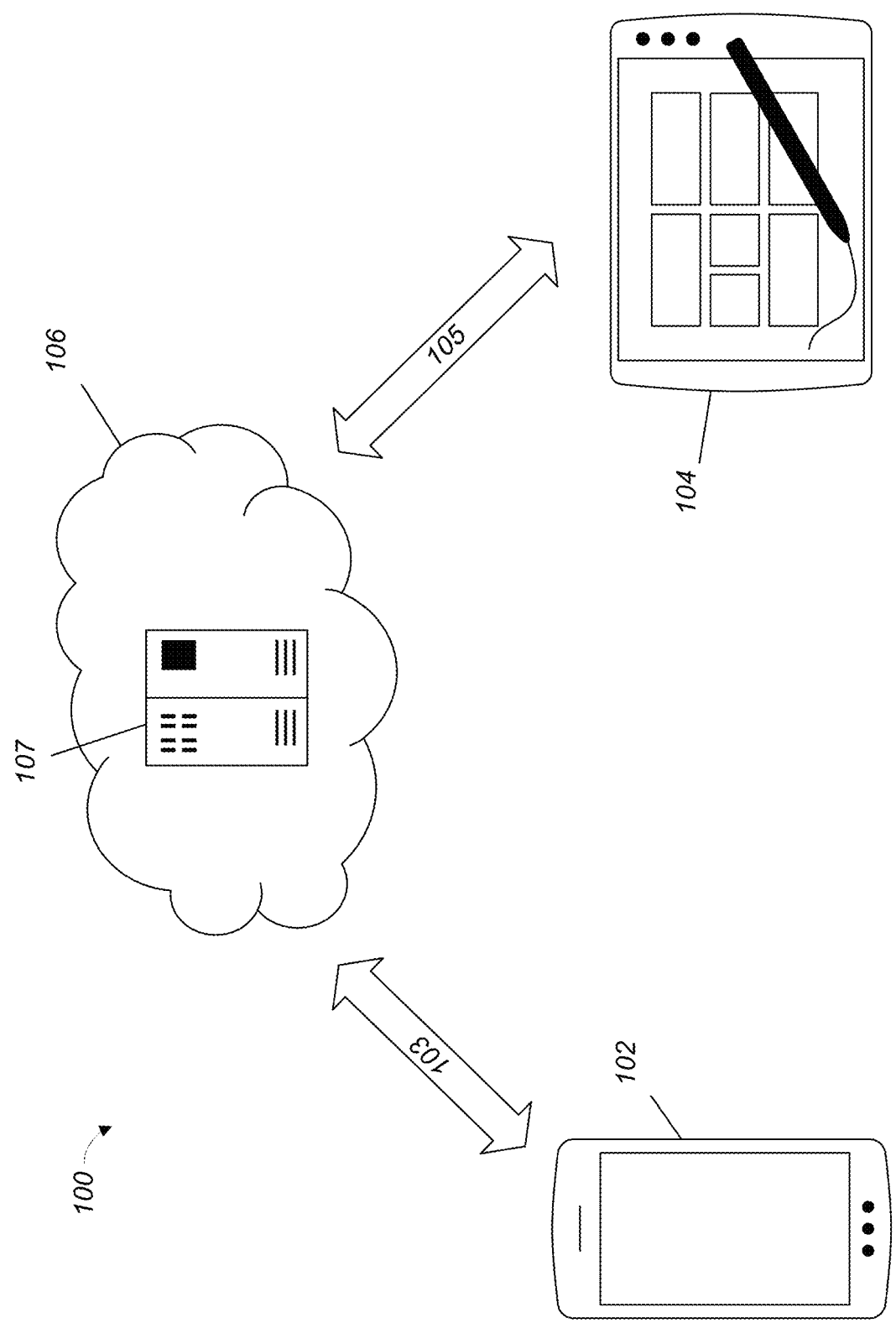
FIG. 1 illustrates a block diagram of the system components of one possible embodiment of an augmented reality system for delivery of professional services.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

The widespread adoption of remote communication services such as Microsoft's Skype®, Apple's Facetime, Google's Duo, and similar Internet-based services that support two-way video communications has enabled distance delivery of a variety of services, such as educational courses, instruction, lessons, and other professional services that primarily require face to face interaction. However, where services involve the manipulation of objects in the presence of the consumer, such techniques may be deficient, particularly where objects to be manipulated by a user may be identified by technical jargon. A professional may not be able to easily describe which objects to manipulate and/or in what fashion to manipulate the objects to a user. Such situations may still necessitate a visit with a professional in person, either by the consumer traveling to the professional, or the professional visiting the person, such as is the typical case in home repairs. An in-person visit, however, may increase the cost to the consumer, where the professional charges for travel time, or may prevent the delivery of services where the desired professional is located at some distance from the consumer. From the professional's perspective, the travel time required for in-person visits may act as a limit on the number of clients a professional may be able to service, thus acting as a hindrance to business growth.

Embodiments disclosed herein provide a platform for the remote or distance delivery of professional services (and other suitable services), with delivery enhanced using augmented reality. The use of augmented reality (AR) techniques can help decrease, if not altogether eliminate, the number of in-person visits a professional may need to undertake, by providing a way for a professional to remotely evaluate a consumer's issues, and to visually demonstrate or indicate actions and/or components upon the consumer's property. For example, in some embodiments a consumer can request services from a professional via the platform. By using a video feed between the consumer and the professional that includes the ability for at least the professional, and possibly the consumer, to generate and superimpose AR objects in the video feed on the fly, the professional may be able to evaluate requirements and/or remotely deliver services involving technical aspects that previously may have required travel to the consumer's location. The professional can assess whether assistance can be rendered via the platform, or if an on-site visit is needed. From the consumer's perspective, the platform can enable access to a broader pool of professional expertise than may otherwise be available locally to the consumer, or possibly not available locally, such as where a consumer lives in a rural area where the desired professional services would require significant travel, a particular needed professional service is unavailable, or services from a particular professional or specialist are desired.

Embodiments disclosed herein may, in other aspects, allow a service provider to evaluate a potential client job for scope and quoting purposes, without requiring an in-person visit. Traditional practice, particularly for home service providers, typically requires either the service provider or a person associated with the service provider to visit a potential client's property to view the proposed work. Such visits may require travel time, and typically are not reimbursed, thus resulting in expenditure of unpaid time. As the disclosed embodiments enable a potential client to provide a real-time or near real-time presentation of a potential job via either images or a video stream, a job may be evaluated and quoted without the need for on-site travel, resulting in a savings of time, and potentially allowing a service provider to evaluate and quote a greater number of jobs in a given time period.

In various embodiments, augmented reality may allow a video feed from the consumer's location to have objects superimposed by a remote professional on the video in a three-dimensional fashion, as if the objects were present in the consumer's location. The professional can control the superimposed objects remotely, and use the objects to facilitate rendering advice to the customer. For example, where a consumer is faced with a plumbing job such as clearing a clogged pipe under a sink, the consumer can initiate a video link with a plumber. By having the consumer point their camera under the sink, the plumber may be able to superimpose a laser point-like dot, an arrow, a circle, or other similar graphic device to better instruct the consumer on what to manipulate and/or steps to take. Other embodiments may allow a professional to demonstrate using 3D objects what assemblies or parts may look like, to give the consumer a clear idea of the intended goal. Still other embodiments may allow transmission and/or embedding of videos, documents, or other materials within the video that may provide a consumer with further relevant instruction.

FIG. 1 illustrates an example system 100 that embodies an augmented reality (AR) platform for the delivery of professional services. System 100 may include a consumer device 102 and a service provider device 104, which in turn may be linked via a network 106. In some embodiments, a user can directly select a desired professional or class of professionals, such as where a water heater needs replacing, a drain needs to be unclogged, an HVAC system needs servicing, or a new light or socket needs installation. In such scenarios, the user may already know at least the type of professional needed, viz. plumber, heating/cooling specialist, electrician, etc. In other embodiments, such as where a particular area of expertise may be needed, system 100 may evaluate a picture of the project captured by a user of consumer device 102, and recommend a particular professional or class of professionals. These two approaches can be combined, in some embodiments, where the system 100 initially selects a class of experts or professionals (e.g. plumbers) based on the captured picture, with the user then making a final selection of a specific professional.

Where multiple professionals are available to respond and/or a class of professionals has been selected, the user and/or system 100 can provide professionals with information about the proposed project or job, including any images or video captured by the consumer device 102. Each professional can then individually evaluate the proposed project or job based on the supplied information and determine whether they are comfortable delivering assistance remotely via system 100, and, via system 100 or another channel of communication, provide an estimate of time and costs, provide an overview of a proposed approach, and any other relevant considerations to assist the user in selecting a suitable professional. For example, if the user needs to fix plumbing beneath a sink, the user may snap a picture of underneath the sink to allow evaluation by professionals.

Where system 100 is at least partially configured to evaluate any captured pictures or video, such evaluation may be carried out using object recognition and/or artificial intelligence. This analysis may be performed automatically, or upon manual triggering by the user. Upon detection, system 100 (which may include any app of consumer device 102) may then suggest possible professionals or a single professional from which the user may select. In some embodiments, system 100 may automatically connect the user to an appropriate professional. In embodiments, a user may simply open up an app on consumer device 102 associated with system 100, and the app may automatically access a camera on consumer device 102 and further automatically capture a picture or video feed, for an essentially "zero-touch" approach. Such embodiments may further automatically evaluate the picture to determine the class or professionals or specific professional to recommend to a user, or may automatically connect the user to an appropriate professional. Still other embodiments may have a user perform a gesture or other input to trigger capture of a picture or video.

Figure 5:
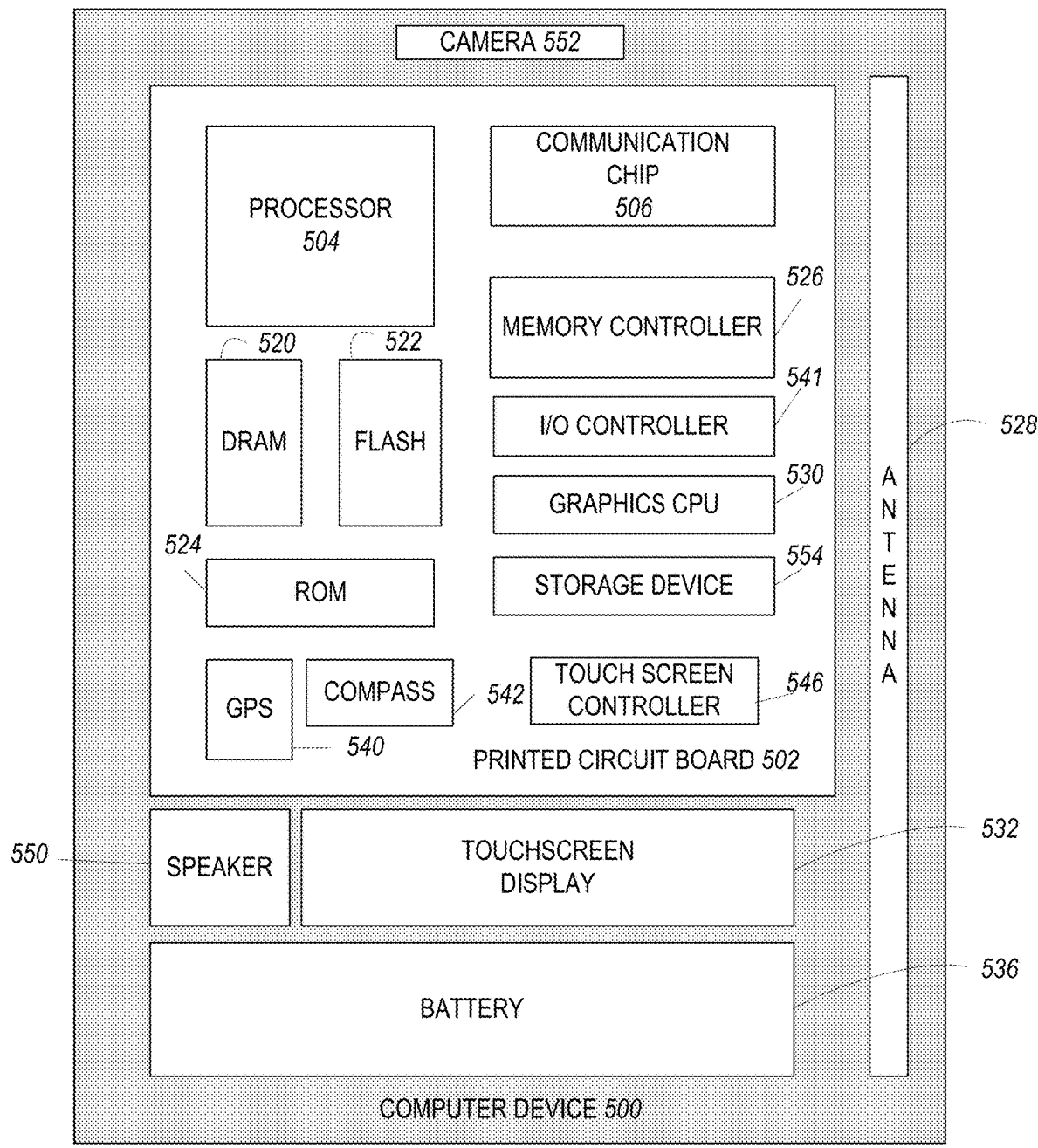
FIG. 5 is a block diagram of an example computer that can be used to implement some or all of the components of the system of FIG. 1.

Consumer device 102 and service provider device 104 may be a computer system such as the computer device 500 depicted in FIG. 5, and in some embodiments may be a mobile device such as a smartphone, tablet, or other similar device that has an integrated processor, screen, video camera, and network communications interface. In other embodiments, consumer device 102 may be a computer system with discrete components, e.g. the system box or CPU is distinct from I/O peripherals. Consumer device 102 and service provider device 104 may be, but do not need to be, identical. For example, a service provider may prefer to use a dedicated computer terminal (e.g. a desktop or laptop computer) to interact with a consumer device 102. Likewise, a consumer may prefer to use a tablet or laptop as alternatives to a smartphone for consumer device 102.

Consumer device 102, in embodiments, includes a camera for taking still photos and/or capturing video, and is capable of transmitting the pictures and/or video over a network 106, as well as receiving data over network 106 that is supplied by a user of service provider device 104. Service provider device 104, similarly, is capable of receiving photos and/or video over network 106 from consumer device 102, and allowing a user of service provider device 104 to place one or more AR objects or otherwise interact with the received photos and/or video. Service provider device 104 can transmit information about the placed AR object(s) over network 106 back to consumer device 102, whereupon consumer device 102 updates a display attached to consumer device 102 to depict the captured photos and/or video with the placed AR object(s).

As mentioned above, consumer device 102 may run a dedicated app to provide functionality for system 100. Other embodiments may allow functionality to be handled via a web site or web application (e.g. a software as a service, "SaaS", approach). Still other embodiments may use dedicated hardware, or a combination of software and hardware, to provide functionality for system 100 to the user. Likewise, service provider device 104 may run a dedicated app to provide functionality for system 100, or use a web site, web application, dedicated hardware, or a combination of the foregoing. Some embodiments may use the same app or other method of delivering necessary functionality on both consumer device 102 and service provider device 104, with functionality appropriate to the user (either the consumer or professional) enabled based upon a user-supplied credential or other indication of the user's role. For example, such an app may provide for capture and transmission of video when configured in a consumer role, and enable placement of one or more AR objects when configured for a service provider role. Other embodiments may provide separate apps (or other methods) for a consumer side and professional side. In some embodiments, a central server 107, discussed below, may provide some or essentially all functionality for system 100, with any application or website on consumer device 102 and/or service provider device 104 acting essentially as a front end for displaying and interacting with content provided by central server 107.

In addition to the functionality described above of image capture, analysis, selection, and connection with a professional, system 100 includes, in embodiments and as mentioned above, the ability for either a user, via consumer device 102, or a professional, via service provider device 104, to superimpose one or more AR objects to assist in the remote delivery of services. Central server 107 may coordinate and synchronize, or assist in the coordination and synchronization, of such AR objects between consumer device 102 and service provider device 104. The functionality of synchronizing AR objects may be supplied by central server 107, consumer device 102, service provider device 104, a combination of two or more of the foregoing, and/or via another provider or source external to system 100, depending upon the specifics of a given implementation. Although previous embodiments described placement of AR objects by the service provider, in other embodiments consumer device 102 may also allow placement and interaction with AR objects, which may further be transmitted and reflected on service provider device 104.

Network 106 may be a network capable of supporting the exchange of a video feed between consumer device 102 and service provider device 104 as well as augmented reality instructions. In some embodiments, network 106 may comprise the Internet, a local area network, wide area network, metropolitan area network, or a combination of the foregoing, or another suitable type or types of network communication. As can be seen, consumer device 102 may connect to network 106 via a communications link 103, and service provider device 104 may connect to network 106 via a communications link 105. Each of communications links 103 and 105 may be any one or more of the foregoing network types. The various devices that comprise network 106 are well known to practitioners skilled in the relevant art, and will not be discussed further herein.

In some embodiments, network 106 comprises a server, collections or clusters of servers, one or more data centers, or other suitable means for data processing. For example, network 106 may be implemented as a cloud service, with consumer device 102 and service provider device 104 each connecting to the cloud service. The cloud service may be operated by a provider of services for system 100. In the depicted example, network 106 includes a central server 107, which may be controlled by the provider of some or all of system 100. Central server 107 may comprise one or more computer devices 500, such as is known for data centers and cloud services. Further, depending on the specific needs of a given implementation, central server 107 may be implemented in a distributed fashion, with multiple node potentially located in geographically diverse areas.

Central server 107 may be configured to handle some or all of the functionality of system 100 described above. For example, central server 107 may handle processing of a picture, series of pictures, or video stream from consumer device 102, and/or interactive directions from service provider device 104. Processing may include performing any analysis via object recognition or artificial intelligence (AI) to select a suitable professional or class of professionals. Central server 107 may coordinate the synchronization of one or more AR objects placed by service provider device 104 to consumer device 102, for presentation on a screen associated with consumer device 102. Central server 107 may further maintain and/or disseminate, to consumer device 102, a list or directory of professionals associated with system 100, from which system 100 selects a professional or class of professionals to recommend or connect to a user of consumer device 102. In some embodiments, central server 107 may only supply a list of one or more professionals in response to a query from consumer device 102, which itself may handle any image analysis, including object recognition or AI processing, to determine a desired professional or class of professionals. In other embodiments, central server 107 may receive the results of any image analysis, and select one or more professionals in response, and supply the results to consumer device 102. In yet other embodiments, central server 107 may receive images or video from consumer device 102 as described above, and handle processing and selection of one or more suitable professionals.

Some combination of any of the foregoing embodiments may also be possible, with a different approach taken depending upon the nature and capabilities of a given consumer device 102. For example, where consumer device 102 is a smartphone running a dedicated app, consumer device 102 may be able to perform some or all object recognition on a captured photo or video, and simply request a list of possible professionals from central server 107. In contrast, where consumer device 102 is a web browser, consumer device 102 may simply pass any photos or video to central server 107 for processing and recommendations.

Consumer device 102 and service provider device 104, in the disclosed embodiments, are capable of establishing a two-way communications link, thereby allowing a user of consumer device 102 to directly connect to a selected professional without need of leaving system 100. In some embodiments, system 100, such as via central server 107, coordinates communications, acting as a relay or communications provider. In such embodiments, central server 107 may also coordinate exchange of AR objects between consumer device 102 and service provider device 104. In other embodiments, consumer device 102 and service provider device 104 directly link over network 106 without going through a central server 107. In such an embodiment, any AR objects inserted into the video stream are communicated directly from one device to the other. In some such embodiments, either consumer device 102, service provider device 104, or aspects of both, may provide the functionality and serve in the capacity of central server 107.

It should be understood that, although the terms "consumer", "user", "professional", and "service provider" are used in throughout this disclosure, these terms are only employed by way of example, and are not otherwise intended to be limiting. The disclosed embodiments may be used between any combination of parties, e.g. only consumers, only service professionals, a consumer and service professional. The terms are broadly interchangeable to refer to any person that uses an embodiment of system 100. A "service provider" or "professional" could use a consumer device 102, and likewise a "consumer" or "user" could use a service provider device 104. Similarly, the labeling of consumer device 102 and service provider device 104 are also only for the sake of example to denote a likely relationship between the users of each device. There may be no practical difference (if any difference at all) between the functionality and capabilities of consumer device 102 and service provider device 104.

Figure 2:
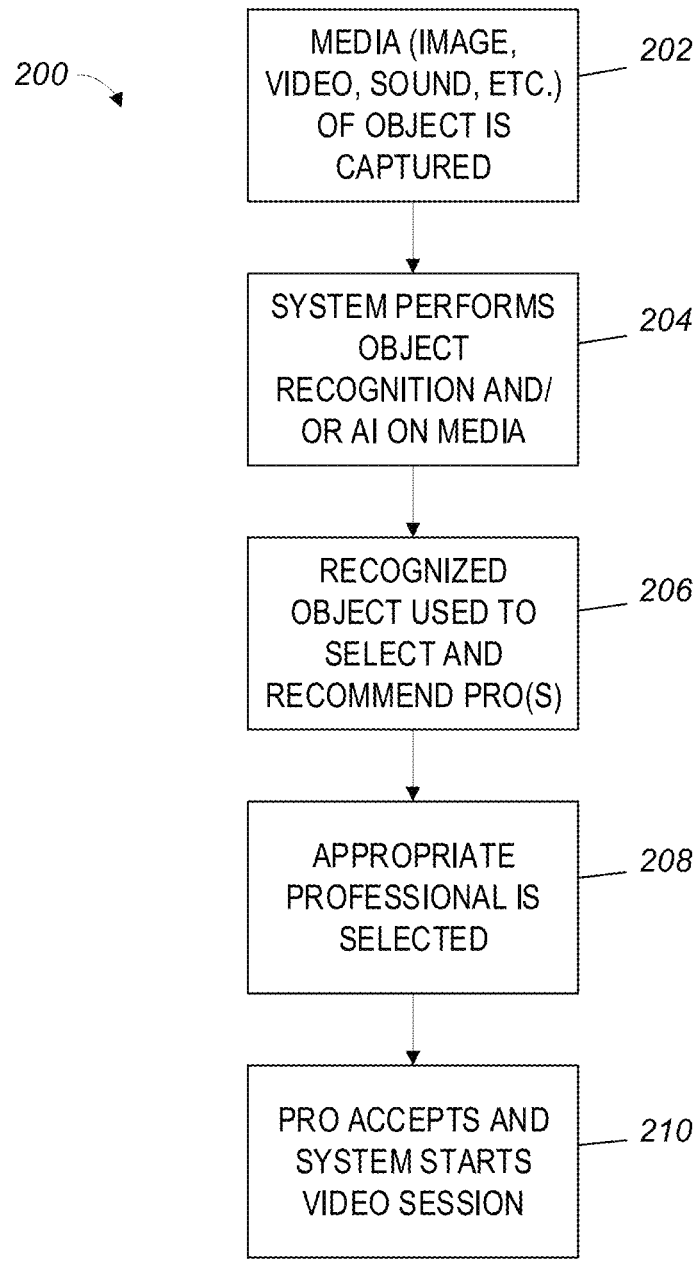
FIG. 2 is a flowchart of a method for operation by a user of an example embodiment of an augmented reality system for delivery of professional services.

FIG. 2 presents a flowchart of one or more blocks that may be carried out, in whole or in part, for an example method 200 for utilizing system 100 in delivering professional services via the augmented reality platform. In block 202, a user may initiate a session with system 100 by first taking a picture of an object with which the user desires assistance, e.g. a pipe or fixture for plumbing, an assembly on a vehicle where automotive repairs are needed, etc. Alternatively and as described above, the user may initiate the session by simply launching an appropriate app (or website, hardware trigger, etc.), which may automatically access a camera and begin searching for objects within the camera's field of view. Other embodiments may trigger capture of a picture or video by means of a user gesture, such as changing the orientation of a consumer device 102 running the appropriate app, e.g. turning consumer device 102 from a portrait to landscape orientation. System 100 may then automatically capture a picture or video without the need for further user interaction.

Next, the system 100 may perform object recognition on the captured picture or video in block 204. Object recognition may be performed using any suitable algorithm or technique now known or later developed. In some embodiments, an AI system, which may be trained with different object variations, e.g. multiple refrigerators, toilets, etc., may be used to provide object detection where a given object may vary in different aspects. The AI system or algorithm may be implemented using any suitable AI technique now known or later developed; in some embodiments, the AI system or algorithm may comprise a neural network or mapping neural network, which may have one or more layers of nodes, and is capable of being trained. As with central server 107, the AI system may be implemented in software, in hardware (including dedicated hardware platforms, such as Apple's Bionic engine), or a combination of both. The particulars of a given AI system or technique implementation will vary depending upon the particular needs of a given embodiment.

The recognized object may then be used by system 100 in block 206 to select professionals from those registered with system 100, in addition to, or in the alternative, criteria that the user may designate. Such criteria may include generally the nature of the user's job, desired experience, geographic considerations, etc. In some embodiments, system 100 may further present recommendations to the user.

For example, if the recognized object is a toilet or a sink, system 100 may search for a list of professionals that specialize in plumbing matters, and present a list of one or more suitable professionals to the user of consumer device 102. The various professionals may be weighted according to various factors, e.g. most relevant to the recognized object, highest amount of experience, highest consumer or customer rating, closest to the user, pricing, etc., and presented to the user in the weighted order. The user may also or alternatively be able to sort by various weighting criteria (e.g. lowest to highest price, best to worst reviews, etc.), and may have previously entered criteria preferences into system 100 to enable system 100 to more accurately select professionals that best fit within a user's preferred criteria and weighting. Alternatively, system 100 may immediately initiate a communications session between the user and the highest matched professional.

For another example, where a toilet is recognized, system 100 may be able to distinguish between brands of toilets, e.g. American Standard, Toto, Kohler, Delta, etc., and may further be able to factor brand into the criteria for selecting a list of professionals, to limit the list or weight the list towards professionals that have direct experience and/or expertise with the particular brand, stock the brand's parts, are an authorized brand service center or provider, or other similar preferential criteria.

For yet another example, where an appliance such as a dishwasher or refrigerator is detected, a user may be prompted to select between multiple possible types of professionals. Depending on the problem, servicing a dishwasher or refrigerator (or similar sort of appliance) may require the services of an appliance repairman, an electrician, or a plumber. The user may then indicate to system 100 which professional is desired. In some embodiments, additional or alternative photos of the appliance may be taken to help system 100 deduce the needed professional. For example, a picture of a refrigerator may be coupled with a fixture of the refrigerator's water line hookup, which system 100 may use, via AI and/or object detection, to determine what a plumber is the needed professional.

As another example different from household repairs, a photo of an instrument may indicate to system 100 that the user is looking for music lessons, with the type of instrument suggesting the type of desired teacher, e.g. piano, guitar, violin, etc. Likewise, a picture of a stereo may lead system 100 to recommend specialists in home theater. In any event, the user may supply system 100 with further information to help narrow down suggested professionals, with the further information supplied in any number of different formats, including photos, text, video, audio, files, or any other suitable format for which system 100 is configured to accept.

In some embodiments, object detection may be combined with, or supplanted by, audio detection. Rather than look for an object, a video file with a recorded sound of a problem may be supplied to system 100, which can use AI or audio pattern matching to select a professional. For example, a picture of a vehicle engine combined with an audio clip of the sound of the engine running may allow system 100 to determine that an auto mechanic is the particular professional required (including a mechanic specific to the make and model, if determined from the picture), with the audio clip indicating that the engine's turbocharger is failing, thus leading system 100 to suggest an auto mechanic that specializes is turbocharged engines. Alternatively, in some embodiments a simple audio file may be all that is required. For example, the sound of a malfunctioning dishwasher may be sufficient to system 100, if properly configured, to determine that a dishwasher needs service, and further the type of service that may be needed.

It should be appreciated that system 100 may be configured to accept any media type or file capable of analysis by automated means as input for selecting one or more relevant professionals. Where a media type other than an image or video is employed, "object recognition" should be understood to encompass any appropriate analysis to determine the object or source of a given media type, e.g. sonic recognition of an automobile engine, a dishwasher, or other object based on a particular unique sound pattern emitted by the object. Object recognition may further be used in conjunction with an AI algorithm, or may be a function carried out by the AI algorithm, such as where the AI algorithm is trained to differentiate between different brands and/or types of an appliance or other object.

In block 206, following selection of one or more professionals, system 100 may further offer the job to the selected professional(s) for evaluation. Some embodiments may submit the job to the selected professionals for evaluation prior to block 208. Thus, when the user makes a selection in block 208, the professional has already evaluated the job and is willing to take it, should the user select them. Other embodiments may omit pre-screening in favor of simply presenting the user with a list of professionals likely suited to handle the user's job. The professional evaluation may occur in block 210 following selection by the user when the professional decides whether to accept the job.

In block 208, the user may select a professional from the recommendations. The user may, in embodiments, review the qualifications of the recommended professionals prior to making a selection. Finally, in block 210, provided the professional also is willing to accept the job, system 100 may initiate a communications session, such as a video stream, between the user and the professional, with the session supporting augmented reality.

In other embodiments, block 208 may be carried out entirely by system 100, without further interaction from the user. In such embodiments, blocks 206 and 208 may be hidden or omitted from the user. Following capture of a picture in block 202, recognition in block 204, and possibly evaluation in block 206, the user may be automatically connected to a professional in block 208 without further interaction. From the perspective of a user in such embodiments, the user simply opens an app on consumer device 102 and points device 102 it at the relevant objects for the job (e.g. pipes beneath a sink). The app then captures a picture, performs object recognition in block 204, selects a pro in block 206 and, provided the professional accepts, immediately proceeds to connect the user to the professional in block 210, effectively bypassing user interaction for block 208. Still other embodiments may omit the requirement of a professional evaluation as part of block 206, and simply select and connect to a professional who previously indicated their willingness to accept certain jobs without requiring specific evaluation.

In some examples, the job may comprise an evaluation for subsequent work, where the user of consumer device 102 uses consumer device 102 to capture and display the relevant objects for the professional to evaluate and quote, with subsequent services potentially delivered in person. In other examples, the job may further or alternatively involve the user of consumer device 102 performing work with the instruction and guidance by the professional. In still other examples, blocks 202-206 may be omitted, such as where a user has a particular professional in mind, and desires to immediately initiate a communications session with the professional for either quoting or service purposes. In any example, the professional may impose one or more AR objects during the communications session in block 210 to direct and/or assist the user of consumer device 102.

Figure 3:
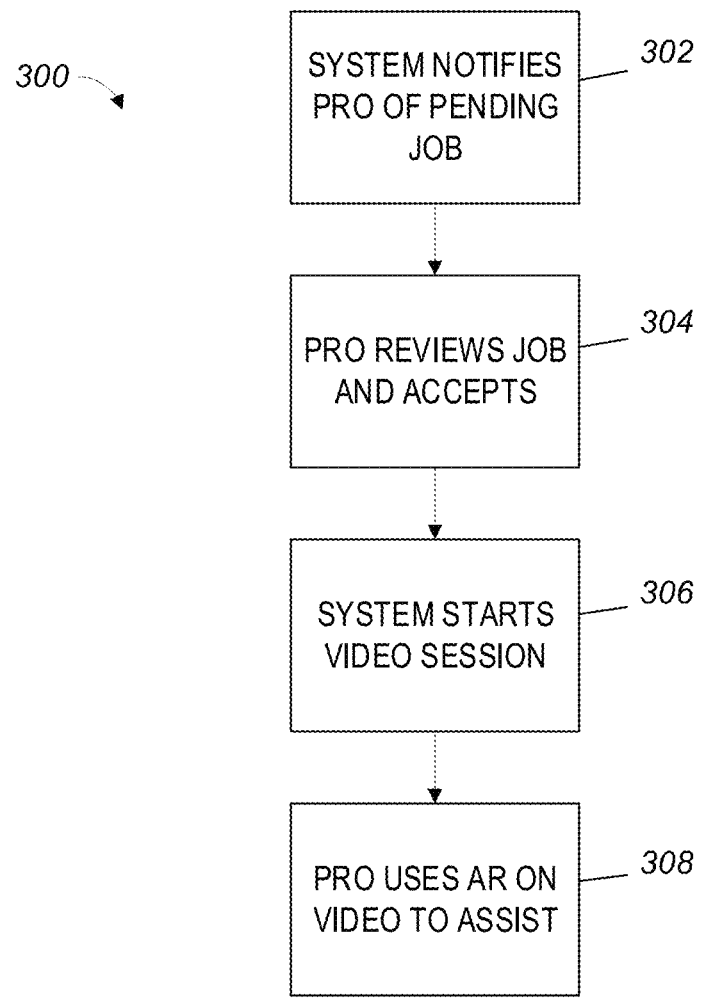
FIG. 3 is a flowchart of a method for operation by a professional of an example embodiment of an augmented reality system for delivery of professional services.

FIG. 3 presents a flowchart of one or more blocks to be carried out, in whole or in part, by an example method 300 for utilizing system 100 by a professional. Following initiation of a job by a user per method 200, system 100 may notify a professional in block 302 of the pending job. The professional may be selected by system 100 on the basis of object recognition and artificial intelligence algorithms applied against a picture or pictures of the offered job by a user. In block 304, the professional may review the job information supplied by the user, e.g. photos, description of goals, desired experience, etc. and, provided the job is acceptable to the professional, the professional may accept the job.

In block 306, following acceptance of the job by the professional, system 100 starts a video session between the user and the professional. The professional can use the video stream to see the specifics of the project the user is tackling or requires a quote for subsequent service, and further can use augmented reality tools to visually demonstrate to the user steps to take, enhancing the delivery of remote services beyond simple voice instructions. Where the session is used for quoting, the professional may employ AR tools to guide the user in providing the professional with necessary information to provide an accurate quote. As mentioned above, in some embodiments a professional may forego evaluation, either simply accepting any job that is offered, or possibly preapproving certain types of jobs that the professional knows can be safely accepted without detailed evaluation.

The use of augmented reality (A/R) tools is disclosed in block 308. The available A/R tools can vary across embodiments. Some examples may include virtual laser pointers, arrows, circles, directional signs, shapes, or potentially unlimited arbitrary shapes in some embodiments that a professional can use to illustrate provided directions. Some embodiments may provide a library of premade shapes. Still other embodiments may provide a library of shapes that vary depending on the nature of the job, e.g. plumbing jobs may have A/R shapes that are suitable to common plumbing tasks; electrical jobs may have shapes suitable to electrical tasks, and so forth. Still other embodiments may allow a user to also supply A/R shapes on the video feed, to help illustrate specific parts of a job to the professional.

It should be appreciated that various blocks or portions of blocks for methods 200 and 300 may be modified or omitted in various embodiments, while other embodiments may add additional tasks or blocks.

Figure 4:
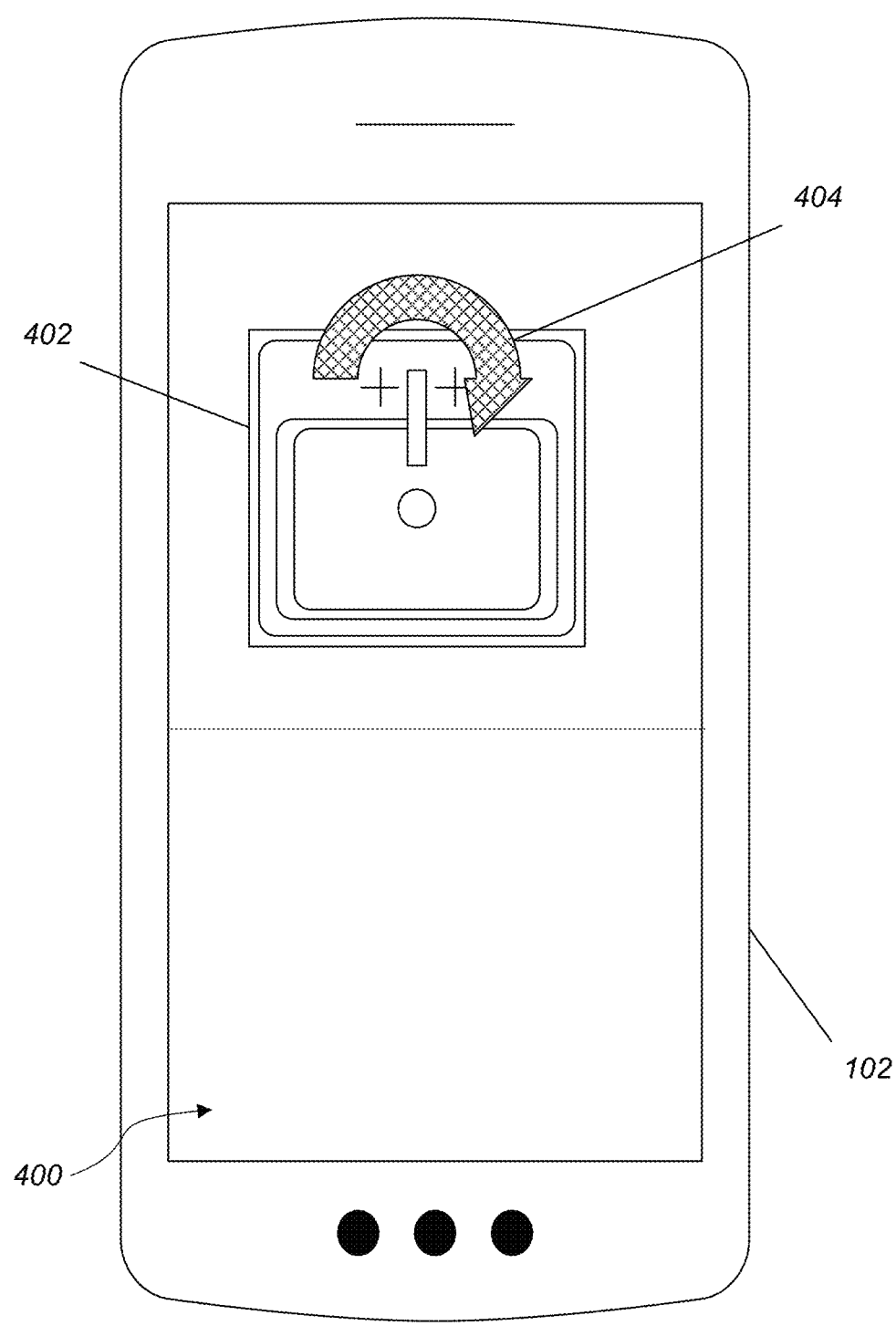
FIG. 4 is a depiction of a user interface for an example embodiment of an augmented reality system for delivery of professional services.

FIG. 4 depicts an interface for an example embodiment of system 100, as seen by a user of system 100. Example consumer device 102 includes a screen 400 for presenting the interface. Depicted here is a job object 402; in this case, object 402 is a kitchen sink as the user is looking for professional services to assist with a plumbing job. The professional connected with the user is able to use an augmented reality service to superimpose a graphic device 404 over the video feed seen by the user. Here, graphic device 404 is shown as a curved arrow, which the connected professional may impose to indicate an action to be taken by the user. Combined with available audio, the professional is able to both show and tell the user steps needed to complete the user's job.

FIG. 5 illustrates an example computer device 500 that may employ the apparatuses and/or methods described herein, in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display (not shown but could include at least the display area 301 of electronic sign 106), a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the system 100 and methods 200 and 300 described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computer device 500 may be a laptop, a netbook, a notebook, an ultrabook, a smartphone, a computer tablet, a personal digital assistant (PDA), a desktop computer, or a server. In further implementations, the computer device 500 may be any other electronic device that processes data.

Figure 6:
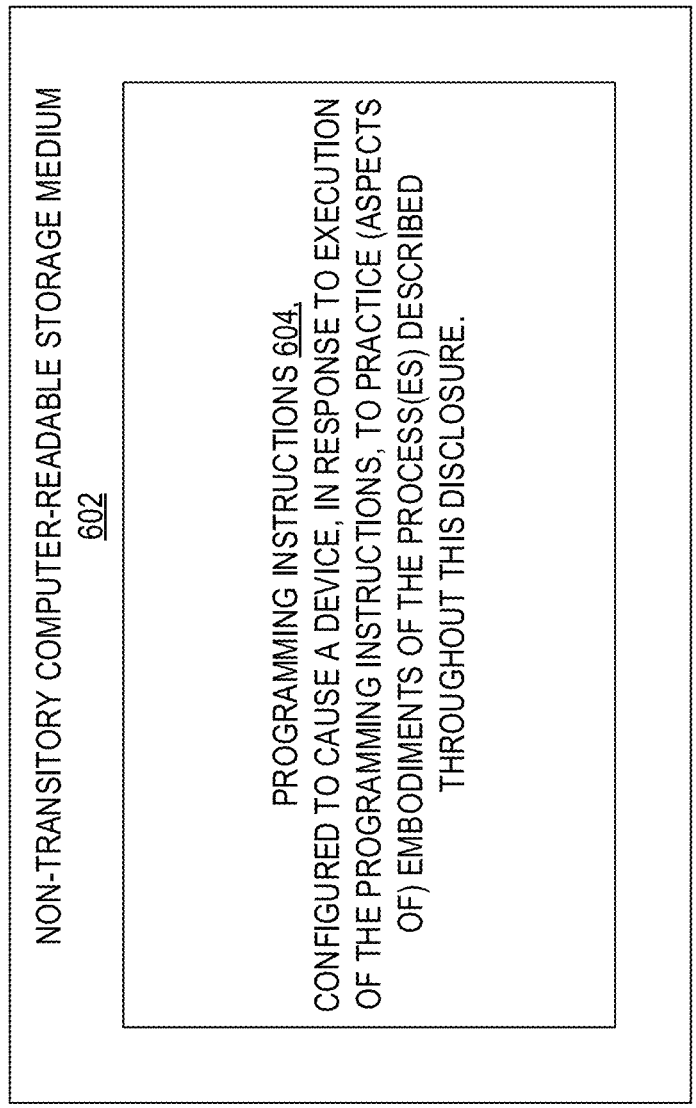
FIG. 6 is a block diagram of a computer-readable storage medium that can be used to implement some of the components of the system or methods disclosed herein, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) system 100, method 200, and/or method 300. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

The invention claimed is:

1. A method comprising:
receiving, at a server, a service request from a user via a first device;
receiving, at the server, at least one media from the first device;
performing, by the server, object recognition upon the media to recognize at least one object;
selecting, by the server, one or more persons to communicate with the user of the first device, each of the one or more persons relevant to at least one aspect of the at least one recognized object;
receiving, by the server, a selection of a person from the list of one or more persons; and
initiating, by the server, a communications session between a second device operated by the selected person and the first device,
wherein the communications session allows insertion, via the second device, of one or more augmented reality objects that are displayed on the first device.

2. The method of claim 1, wherein the server comprises the first device.

3. The method of claim 1, wherein the server comprises the second device.

4. The method of claim 1, wherein the first device and second device are remote from the server, and each of the first device and second device communicate with the server over a network.

5. The method of claim 1, further comprising using an artificial intelligence algorithm for performing the object recognition.

6. The method of claim 1, wherein the communications session comprises a video session.

7. The method of claim 1, wherein the selected person is automatically selected by the server on the basis of the recognized object.

8. The method of claim 1, wherein the selected person is selected by the user of the first device.

9. A non-transitory computer-readable medium (CRM) comprising instructions that, when executed by an apparatus, cause the apparatus to:
receive a service request from a user via a first device;
receive at least one image from the first device;
perform object recognition upon the image to recognize an object; and
establish, in response to the service request, a video communications session between the first device and a second device with a user,
wherein the video communications session allows insertion, via the second device, of one or more augmented reality objects that are displayed on the first device, and
wherein the user of the second device was selected as relevant to at least one aspect of the recognized object.

10. The CRM of claim 9, wherein the instructions are to further cause the apparatus to:
select a list of a plurality of persons to communicate with the user of the first device, each of the plurality of persons relevant to at least one aspect of the recognized object; and
receive, from the first device, a selection of a person from the list of the plurality of persons,
wherein the selected person is the user of the second device.

11. The CRM of claim 10, wherein instructions are to further cause the apparatus to select the person automatically on the basis of the at least one recognized object.

12. The CRM of claim 9, wherein the apparatus comprises the first device.

13. The CRM of claim 9, wherein a server comprises the second device.

14. The CRM of claim 9, wherein the first device and second device are remote from the apparatus, and each of the first device and second device communicate with the apparatus over a network.

15. The CRM of claim 9, wherein the instructions are further to cause the apparatus to use an artificial intelligence algorithm for object recognition.

16. A method comprising:
receiving, by a first device with a user, a service request and an image from a second device;
performing object recognition on the image to recognize at least one object;
receiving, by the first device in response to accepting the service request, a video stream from the second device; and
transmitting, from the first device, at least one augmented reality object superimposed on the video stream, to be displayed on the second device,
wherein the user of the first device was selected as relevant to at least one aspect of the at least one recognized object.

17. The method of claim 16, further comprising:
providing the results of the object recognition to the first device.

18. The method of claim 17, wherein performing object recognition comprises using an artificial intelligence algorithm.

19. The method of claim 16, wherein the method is performed by the first device.

20. The method of claim 16, wherein the method is performed by a server that is remote from the first device and second device.

* * * * *